(12) United States Patent
Safai

(10) Patent No.: US 12,025,564 B2
(45) Date of Patent: Jul. 2, 2024

(54) AUTOMATED INSPECTION OF FOREIGN MATERIALS, CRACKS AND OTHER SURFACE ANOMALIES

(71) Applicant: The Boeing Company, Arlington, VA (US)

(72) Inventor: Morteza Safai, Newcastle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/312,873

(22) Filed: May 5, 2023

(65) Prior Publication Data
US 2023/0273132 A1 Aug. 31, 2023

Related U.S. Application Data

(62) Division of application No. 15/931,828, filed on May 14, 2020, now Pat. No. 11,680,909.

(51) Int. Cl.
| | |
|---|---|
| *G01N 21/88* | (2006.01) |
| *B29C 64/371* | (2017.01) |
| *B29C 64/393* | (2017.01) |
| *B33Y 10/00* | (2015.01) |
| *B33Y 30/00* | (2015.01) |

(Continued)

(52) U.S. Cl.
CPC ....... *G01N 21/8806* (2013.01); *B29C 64/371* (2017.08); *B29C 64/393* (2017.08); *B33Y 10/00* (2014.12); *B33Y 30/00* (2014.12); *B33Y 50/02* (2014.12); *G01N 21/8851* (2013.01); *G01N 21/95* (2013.01); *G01N 2201/06113* (2013.01); *G01N 2201/0627* (2013.01); *G01N 2201/0628* (2013.01)

(58) Field of Classification Search
CPC .............. G01N 21/8851; G01N 21/95; G01N 21/8806; G01N 2201/0628; G01N 2201/06113; G01N 2201/0627; B29C 64/371; B29C 64/393; B33Y 50/02; B33Y 30/00; B33Y 10/00; B22F 12/90; B22F 12/70; B22F 10/38; B22F 2999/00; B22F 2201/10; B22F 2201/02; B22F 2203/03
See application file for complete search history.

(56) References Cited

U.S. PATENT DOCUMENTS

| | | |
|---|---|---|
| 2016/0033756 A1 | 2/2016 | Miller |
| 2017/0087634 A1 | 3/2017 | Beacham, Jr. et al. |
| 2017/0239892 A1 | 8/2017 | Buller et al. |

(Continued)

*Primary Examiner* — Sang H Nguyen
(74) *Attorney, Agent, or Firm* — MH2 Technology Law Group LLP

(57) ABSTRACT

A method for real-time surface imperfection detection for additive manufacturing and 3-D printing parts is provided. The method includes directing a first light radiation using one or more illumination sources, wherein the first light radiation illuminates a target area of a part being manufactured in a uniform chromatic light such that the target area appears to have a substantially uniform monochromatic color; capturing a current image of a second light radiation that is scattered or reflected by the target area using one or more feedback cameras; and analyzing the current image of the second light radiation using at least one of the one or more feedback camera with a previously acquired image to determine whether a surface imperfection exists or does not exist.

20 Claims, 5 Drawing Sheets

(51) Int. Cl.
*B33Y 50/02* (2015.01)
*G01N 21/95* (2006.01)

(56) References Cited

U.S. PATENT DOCUMENTS

| | | | |
|---|---|---|---|
| 2017/0266727 A1* | 9/2017 | Nishino | G01N 21/1702 |
| 2017/0297095 A1 | 10/2017 | Zalameda et al. | |
| 2017/0326867 A1* | 11/2017 | Hartke | B29C 64/153 |
| 2018/0073390 A1 | 3/2018 | Varney | |
| 2018/0104742 A1* | 4/2018 | Kottilingam | B33Y 10/00 |
| 2018/0297113 A1 | 10/2018 | Preston et al. | |
| 2018/0304361 A1* | 10/2018 | Gibson | B33Y 80/00 |
| 2018/0345409 A1* | 12/2018 | Pavlov | B22F 12/45 |
| 2018/0345582 A1 | 12/2018 | Schade | |
| 2019/0056334 A1 | 2/2019 | Safai | |
| 2019/0302043 A1 | 10/2019 | Lobastov et al. | |
| 2019/0381736 A1 | 12/2019 | Jensen et al. | |
| 2019/0385760 A1* | 12/2019 | Zijp | G21K 1/06 |
| 2019/0389137 A1 | 12/2019 | Frohnmaier et al. | |
| 2020/0110025 A1 | 4/2020 | Yacoubian | |

\* cited by examiner

AUTOMATED INSPECTION OF FOREIGN MATERIALS, CRACKS AND OTHER SURFACE ANOMALIES

CROSS REFERENCE TO RELATED APPLICATIONS

This application is a divisional of and claims priority to U.S. patent application Ser. No. 15/931,828, filed May 14, 2020, now U.S. Pat. No. 11,680,909 issued Jun. 20, 2023, the disclosure of which is hereby incorporated herein by reference in its entirety.

FIELD

The present teachings relate to the field of manufacturing inspection and, more particularly, to inspection systems including surface illumination and imaging subsystems.

BACKGROUND

Manufacturing components using 3D printing techniques, also known as and referred to herein as additive manufacturing, are increasingly becoming commonplace. Such manufacturing can be used for vehicles such as aircraft and aerospace vehicles, ground vehicles, etc., as well as for other industries. Detection of crack, pits, and discoloration are typically done by visual inspection after the part has been built and removed from a 3D printing chamber. Sometimes many of the same parts are made with the same imperfections. By knowing if there are problems during the manufacturing process, one can determine the problem early in the manufacturing process and correct or stop the process. This can result in substantial cost savings both in materials and in time of use of additive manufacturing machines.

Accordingly, an improved inspection method and system can be useful in improving a 3D printing manufacturing process.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

According to examples of the present disclosure, a method for real-time surface inspection for additive manufacturing and 3-D printing parts is provided. The method comprises directing a first light radiation using one or more illumination (i.e., optical) sources, wherein the first light radiation illuminates a target area of a part being manufactured in a uniform chromatic light such that the target area appears to have a substantially uniform monochromatic color; capturing a current image of a second light radiation that is scattered or reflected by the target area to generate a first output using one or more feedback cameras; and analyzing the current image of the second light radiation using at least one of the one or more feedback camera by comparing the current image with a previously acquired image to determine whether a surface imperfection exists.

In some examples, the method can further comprise stopping the additive manufacturing based on a determination that the surface imperfection exists. In some examples, the method can further comprise continuing the additive manufacturing based on a determination that the surface imperfection does not exist.

In some examples, the method can further comprise conditioning the first light radiation using one or more filters to produce a conditioned first light radiation that results in the uniform chromatic light.

In some examples, the method can further comprise adjusting at least one of the one or more illumination sources to produce a third light radiation to homogenize a fourth light radiation reflected from the target area.

In some examples, a first illumination source of the one or more illumination sources can comprise a plurality of light emitting diodes, a plurality of organic light emitting diodes, or a plurality of lasers.

In some examples, each element of the plurality of light emitting diodes or the plurality of organic light emitting diodes is individually controlled to produce a hue, a saturation, or a color of each element.

In some examples, a first filter of the one or more filters comprises a holographic filter or a dichromatic polarizer.

In some examples, the surface imperfection comprises foreign material, cracks, discoloration, pits, or a combination thereof.

In some examples, the method can further comprise displaying data obtained from the at least one of the feedback cameras onto a display for inspection by an operator.

In some examples, the one or more feedback cameras are one or more CMOS high definition cameras.

In some examples, the adjusting at least one of the one or more illumination sources to produce the third light radiation results in homogenizing the fourth light radiation reflected from the target area except for a fifth light radiation reflected from the surface imperfection.

In some examples, the surface imperfection is detected based on an analysis of hue and saturation of the second light radiation to distinguish anomalies.

In some examples, the analyzing the current image of the second light radiation using at least one of the one or more feedback camera, further comprises determining that a predetermined threshold level for at least one characteristic of the current image is met.

In some examples, the one characteristic is a hue, a saturation, or a brightness.

In some examples, the target area comprises the entirety of the part.

In some examples, the first light radiation is a monochromatic illumination radiation.

According to examples of the present disclosure, a system for real-time surface inspection for additive manufacturing and 3-D printing parts is provided. The system comprises an additive manufacturing chamber comprising a part to be manufactured; one or more illumination sources configured to produce a first light radiation; one or more filters that are configured to condition the first light radiation, wherein the first light radiation that is conditioned illuminates a target area of the part being manufactured in a uniform chromatic light; one or more feedback cameras configured to capture a current image of a second light radiation that is scattered or reflected by the target area and determine a presence of a surface imperfection at or near the target area based on the second light radiation; and a controller coupled to the one or more illumination sources and the one or more feedback cameras and configured to adjust at least one of the one or more illumination sources to produce a third light radiation to homogenize a fourth light radiation reflected from the target area based on the one or more feedback cameras, wherein a first feedback camera of the one or more feedback cameras is configured to detect the surface imperfection based on the fourth light radiation.

In some examples, the additive manufacturing chamber comprises a valve from which a noble gas is introduced. In some examples, the noble gas can be, for example, helium, nitrogen, neon, argon, krypton and combinations thereof.

According to examples of the present disclosure, a non-transitory computer-readable medium is provided that comprise instructions, that when executed by a hardware processor, cause the hardware processor to perform operations to execute a method for real-time surface inspection for additive manufacturing and 3-D printing parts, the method comprising: controlling a first light radiation using one or more illumination sources, wherein the first light radiation illuminates a target area of a part being manufactured in a uniform chromatic light such that the target area appears to have a substantially monochromatic color; capturing a current image of a second light radiation that is scattered or reflected by the target area to generate a first output using one or more feedback cameras; analyzing the current image of the second light radiation using at least one of the one or more feedback cameras by comparing the current image with a previously acquired image to determine whether a surface imperfection exists. In some examples, the operations further comprise stopping the additive manufacturing based on a determination that the surface imperfection exists or does not exists. In some examples, the operations further comprise continuing the additive manufacturing based on a determination that the surface imperfection does not exist. The surface imperfection can comprise foreign material, cracks, discoloration, pits, or a combination thereof. Each element of the one or more illumination sources can be individually controlled to produce a hue, a saturation, or a color of each element.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
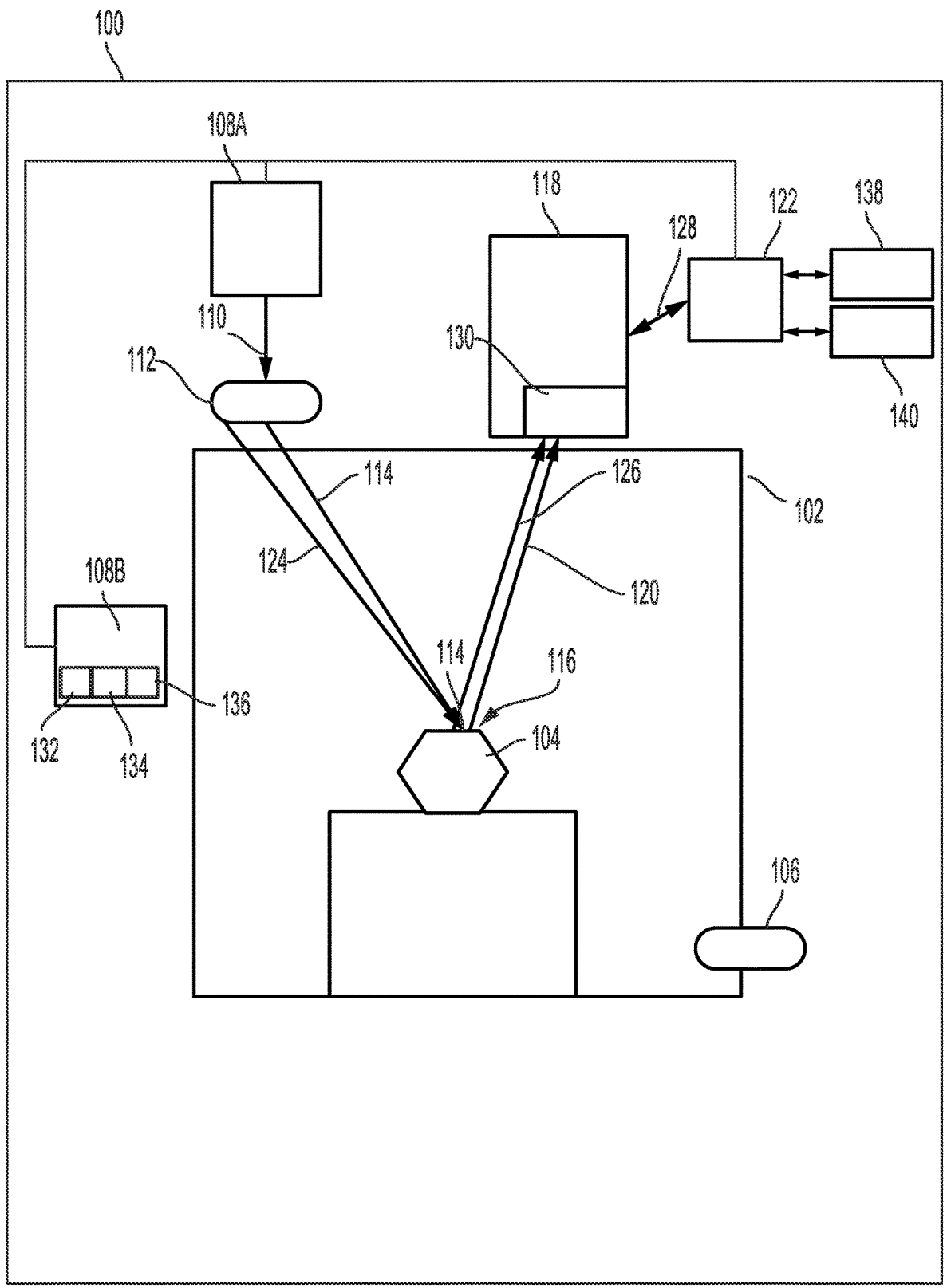
FIG. 1 is a schematic depiction of an example inspection system according to the present teachings.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Eliminating imperfections during manufacture of 3D printed components is important to ensure that parts operate as expected. However, some types of imperfections introduced during manufacturing are difficult to detect, for example, because of the surface color of composite or metallic structures can camouflage or mask the imperfection, which can be the same color and/or have the same appearance as the part being manufactured. Examples of an imperfection include, but are not limited to, cracks, pits and discoloration, lack of fusion, foreign materials, and surface porosity. Once manufacturing has been completed, these imperfections can result in rejection of a large and expensive structure during subsequent visual inspection or nondestructive testing. Currently, there are no inspection techniques that can detect both cracks and contamination for example, in a finished part. Thus, detection of cracks and contamination during the manufacturing process would provide an improvement over conventional techniques.

Generally speaking and in one non-limiting example, multiple ultra-bright organic light emitting diodes in combination with holographic filters are used to overexpose the surface with light to produce an image having a color that completely blends the background color to form a uniform monochromatic color over the surface to be inspected, which enables detection and/or visualization of an imperfection that would otherwise be hidden and undetectable. This technique uses a feedback control in selecting from over a million colors that can be illuminated on the part surface, using a feedback camera to adjust illumination. For example one or more CMOS high definition cameras are used, which provide feedback to enable the background color to be blended to form a uniform monochromatic color over the surface to be inspected and allow for a large dynamic range of color variation to be detected that can highlight the presence of surface anomalies.

To select a uniform light that blends the background color to form the uniform monochromatic color over the surface to be inspected a hue and/or saturation chart obtained from a lookup table can be used for selection from millions of color options that can be produced from one or more OLED or similar illumination sources. Alternatively and/or additionally, one or more holographic filters can be used to provide the uniform light on a surface of a part being inspected. The wavelength of the uniform light is selected such that is produces a color wash reflection from the surface of the part, which also at least reduces if not eliminates midtones. The uniform light serves to prevent variations in the light during the image subtraction process Depending on the types of surfaces being inspected, a dichromatic polarizer can be used to remove or reduce glare from sharp corners, which can obscure or interfere with detection of an imperfection. One or more feedback cameras can be used to choose several million shades of colors per second to adapt the environment while scanning the surface for anomalies and imperfections. Then, hue and/or saturation can be used to distinguish the anomalies or imperfections. By knowing if there is a problem during manufacturing, an operator can determine if a problem has occurred early in the manufacturing process and correct the manufacturing process or stop the process. If smoke is present during the manufacturing process, the smoke can be cleared from the manufacturing chamber by purging the manufacturing chamber with a noble gas, such as helium, nitrogen, neon, argon, or krypton. This can result in the identification of imperfections, as well as in a more efficient manufacturing process both in terms of material used and in use of the additive manufacturing machines.

An implementation of the present teachings includes an inspection system and method for detecting imperfections during the manufacture of a composite part and other articles of manufacture. FIG. 1 is a schematic illustration depicting an example inspection system 100 in accordance with the present teachings for inspecting a workpiece. Inspection system 100 comprises additive manufacturing chamber 102. Additive manufacturing chamber 102 is used to build part 104 using 3D manufacturing techniques. In some examples, additive manufacturing chamber 102 can comprise valve 106 from which a noble gas is introduced. In some examples, the noble gas can include helium, nitrogen, neon, argon, krypton, or combinations thereof. Depending on the workpiece being manufactured, noble gases such as nitrogen, neon, argon, and krypton may be used. Inspection system 100 comprises one or more illumination sources, such as a first illumination source 108A and/or second illumination source 108B. First illumination source 108A is configured to produce first light radiation 110. First light radiation 110 is a monochromatic light. As used herein, monochromatic light refers to light in which electromagnetic waves maintain a fixed and predictable phase relationship with each other over a period of time. Inspection system 100 can comprises one or more filters 112 that are configured to condition first light radiation 110 to produce conditioned first radiation light 114. The first light radiation 110 that is conditioned illuminates target area 116 of part 104 being manufactured in a uniform chromatic light such that target area 16 appears to have a uniform monochromatic color except for surface imperfection that reflect or scatter the uniform chromatic light differently than target area 16 without surface imperfections. Inspection system 100 comprises one or more feedback cameras 118 that are configured to obtain second light radiation 120 that is scattered or reflected by target area 116 and to determine a presence of a surface imperfection at or near target area 116 based on second light radiation 120. Inspection system 100 comprises controller 122 that is coupled to one or more first illumination sources 108A, one or more second illumination sources 108B, and one or more feedback cameras 118 and is configured to adjust at least one of one or more first illumination sources 108A, one or more second illumination sources 108B to produce third light radiation 124 to homogenize fourth light radiation 126 reflected from target area 116 based on first output 128. The second light radiation 120 and/or the fourth light radiation 126 is received by the one or more feedback cameras 118 and are analyzed to determine a presence of the surface imperfection using one or more image processing algorithms as discussed below. First feedback camera 130 of one or more feedback cameras 118 is configured to detect the surface imperfection based on fourth light radiation 126.

As used herein, the first light radiation is light produced by either the first illumination source 108A or the second illumination source 108B that is initially incident on part 104. The second light radiation is light that is reflected and/or scattered by part 104 from the incident first light radiation. The third light radiation is light produced by either the first illumination source 108A or the second illumination source 108B that is incident on part 104 that is modified by either the first illumination source 108A or the second illumination source 108B based on analysis of one or more feedback cameras 118. The fourth light radiation is light that is reflected and/or scattered by part 104 from the third light radiation.

One or more illumination sources, such as first illumination source 108A and/or second illumination source 108B, can be electrically connected to controller 122 to control one or more parameters of the light emitted by the one or more illumination sources. One or more illumination sources can be or include one or more lasers 132, one or more organic light emitting diode (OLED) arrays 134 including a plurality of OLEDs, one or more light emitting diode (LED) arrays 136 including a plurality of LEDs, or another illumination source configurable as described herein. For example, each laser of the one or more lasers 132, each OLED of the plurality of OLEDs, or each LED of the plurality of LEDs can be configured to output an intensity of at least 1000 lux, and can have a luminous efficiency of at least 100 lumens per Watt (lm/W), or at least 125 lm/W, or at least 150 lm/W, to enable a very bright illumination of the part being manufactured, which helps to be able to discern different intensity and/or colors because different imperfections may be detectable under different lighting conditions. One or more first illumination sources 108A and/or one or more second illumination sources 108B are electrically coupled to, and can be controlled by controller 122. First light radiation 110 and/or third light radiation 124 are variable or configurable with respect to one or more of a light intensity, a hue of the light output, a saturation, or one or more colors output by the one or more first illumination sources 108A and/or the one or more second illumination sources 108B. This variability allows control of the first light radiation to blend the background color to form a uniform monochromatic color over the surface to be inspected. Each element of the one or more illumination sources, such as the plurality of light emitting diodes or the plurality of organic light emitting diodes, can be individually controlled to produce different light intensities, different hues, saturations, or different colors of each element. Variable and/or configurable control can be implemented by controller 122, which can change a current, a voltage, and/or a pulse width modulation that is supplied to the one or more illumination sources. Additionally or alternatively, variable and/or configuration control can be implemented by controller 122 using a hue/saturation look up table to change a hue or saturation of the output light. The variable and/or configuration control allows for different imperfections to be detectable under different lighting conditions. In one example, a feedback control camera, in combination with a processor, is used to receive and analyze reflected and/or scattered light from the part.

One or more feedback cameras 118 are configured to image target area 116 or other areas, including the entirety of part 104. One or more of feedback cameras 118 can include a charge coupled device (CCD) imager, a complementary metal oxide semiconductor (CMOS) imager, a high speed video camera, or another suitable imager, which provide a high response time and a wide range of wavelengths that are detectable to enable blending of the background color to form a uniform monochromatic color over the surface to be inspected and to allow imperfections in the surface to be distinguished. Display 138 is coupled to controller 122 to display the output of one or more feedback cameras 118 for review by an operator as described below.

As discussed above, the surface color of at least target area 116 of part 104 can color-matched (e.g., camouflaged) to a background, such a color of a sidewall of additive manufacturing chamber. Conventional inspection systems are generally ineffective at reliably detecting foreign materials, particularly when the foreign material is of the same or similar composition, color, and texture as the part being inspected.

In an implementation of the present teachings, processor 140 of inspection system 100 performs image processing and comparison of first output 128 (e.g., a first data set) derived from first feedback camera 130 of one or more feedback cameras 118 based on second light radiation 120 with a second output (a second data set) derived from first feedback camera 130 or another feedback camera of one or more feedback cameras 118 based on fourth light radiation 126. The image processing performed by processor 140 includes a pixel-by-pixel comparison of images of a currently acquired image of the part and a previously acquired image of the part or an image of a known defect-free part in the same orientation as the part being manufactured. Processor 140 determines that if the color of each pixel at the same coordinate of both images coincide, then during the subtraction process, the net result is zero and the light radiation is set at the correct value. Processor 140, through controller 122, can then modify first light radiation 110 output by one or more first illumination sources 108A and/or the one or more second illumination sources 108B to result in third light radiation 124. Further details of the functioning of processor 140 are provided below. For example, controller 122 can change a current, a voltage, and/or a pulse width modulation that is supplied to the one or more illumination sources.

Once first light radiation 110 has been modified according to first output 128 determined by processor 140 based on the image processing and comparison, first output 128 from first feedback camera 130 of one or more feedback cameras 118 can then be compared again to the second output from first feedback camera 130 or another feedback camera of one or more feedback cameras 118, which is used to modify first light radiation 110 output by one or more first illumination sources 108A and/or the one or more second illumination sources 108B. Processor 140, using one or more of the image processing techniques, compares a currently acquired image with previously acquired images of the product or a known defect-free image of the same part in the same orientation to perform the subtraction process to identify anomalies. This series of comparisons and resulting changes in first light radiation 110 output by one or more first illumination sources 108A and/or the one or more second illumination sources 108B can continue in an attempt to match or camouflage the background i.e., to cancel out background colors; to homogenize light reflected from the background of target area 116 or the entirety of part 104 such that only the foreign material(s), crack(s), pit(s), and/or other surface anomalies or imperfections are differentiated from the background within the image taken by one or more feedback cameras 118. The qualities and characteristics of first light radiation 110 can be adjusted by controller 122, for example, until background features of target area 116 imaged by one or more feedback cameras 118 become sufficiently washed out that any imperfections are imaged with a high contrast compared to the background. Further, a first image of target area 116 can be taken prior to illumination with first light radiation 110 and compared and evaluated with a second image of target area 116 taken subsequent to the illumination with first light radiation 110 to determine the effectiveness of first light radiation 110, which can be further adjusted to further contrast any surface imperfection(s) with the background surface. Once processor 140 determines this final state has been reached where part 104 has been camouflaged or approximated through the process of feedback control of one or more first illumination source 108A and/or one or more second illumination sources 108B, controller 122 can display the image on display 138 for viewing by an operator, who can then correct issues in the manufacturing process that produced the surface anomaly. For example, by using an image subtraction technique, the entire part should not show up in the difference of the subtraction. If any difference is determined, then that difference can be due to a presence of a imperfection. The correction may include removing the foreign material, repairing a surface imperfection, or other imperfection in part 104, or another correction.

This technique is enabled, at least in part, by feedback control in individually selecting from over one million colors, variable hue, variable saturation, and variable patterns that can be output by one or more first illumination sources 108A and/or one or more second illumination sources 108B onto target area 116 of part 104. For example, the feedback control can continuously adjust one or more operating parameters of the one or more illumination sources until the part is camouflaged with respect to a background color as determined by one or more image processing algorithms. A histogram of a current image of the part and a histogram of the one or more previously acquired images of the part or a known defect-free image of the same part in the same orientation can be created for each instance of an operating parameter of the one or more illumination sources color and a comparison of the two histograms can be made. A final state of the operating parameters of the one or more illumination sources can be reached when the histogram of current image and the histogram of the one or more previously acquired images of the part or the known defect-free image of the same part in the same orientation match or when the difference between the two is minimized or zero. A suitable first light radiation 110 initially attempts to mask target area 116. The image captured by first feedback camera 130 can be analyzed by processor 140, which then alters one or more qualities or characteristics (e.g., hue, saturation, pattern, etc.) of one or more first illumination sources 108A and/or one or more second illumination sources 108B to homogenize the reflectance of second light radiation 120 and/or fourth light radiation 126 from target area 116 and/or to camouflage target area 116. By homogenizing the reflectance and/or camouflaging target area 116, contrast of anomalies and/or imperfections such as foreign materials, cracks, pits, etc., is increased, thereby improving the detection of these anomalies and/or imperfections. One or more first illumination sources 108A and/or one or more second illumination sources 108B can simultaneously produce several million shades of color per second while varying the hue, saturation, intensity, and pattern, which can be selected by processor 140, thereby adapting the viewing environment to enhance the ability to detect imperfections. The adjustment of first light radiation 110 with respect to one or more of color, intensity, hue, and saturation aids in distinguishing an inherent pattern of the background from anomalies that, under white light, can be camouflaged.

Figure 3:
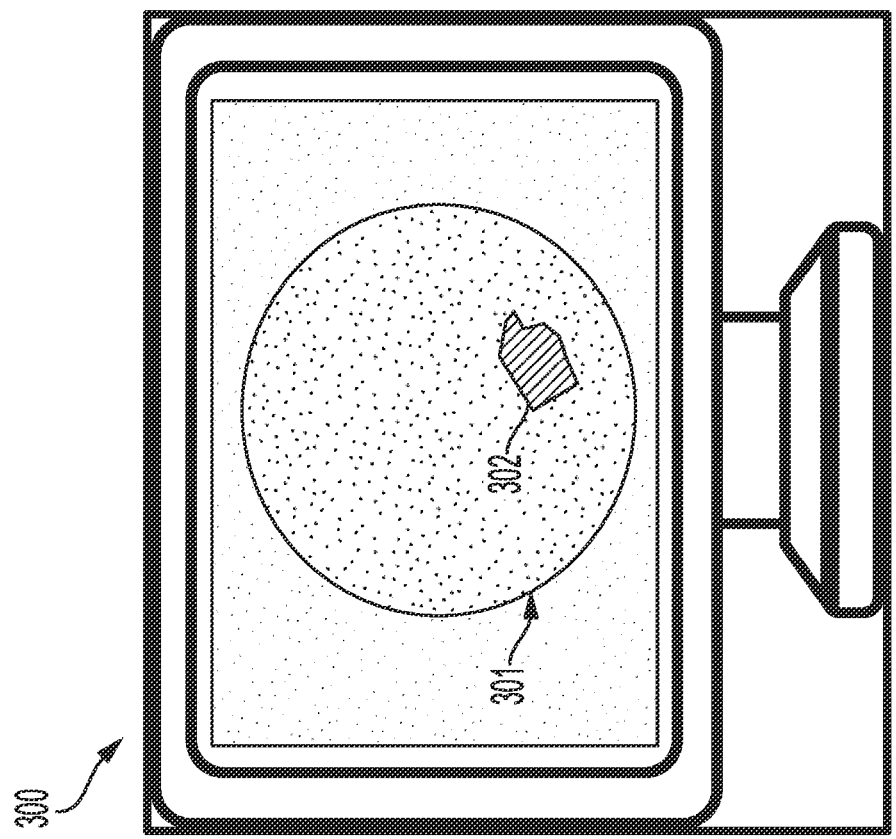
FIG. 3 depicts an example structure when illuminated with a second light arrangement according to the present teachings.
Figure 2:
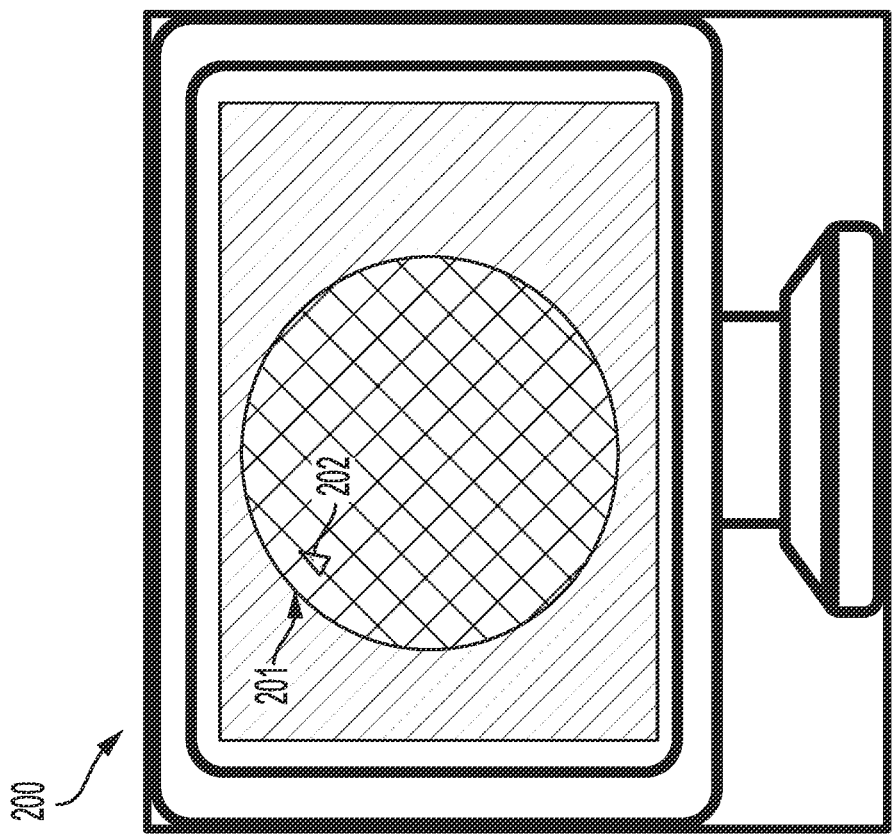
FIG. 2 depicts an example structure when illuminated with a first light arrangement according to the present teachings.

FIG. 2 represents a first view 200 of part 104 that might be imaged by one or more feedback cameras 118 under a first light illumination parameter. Part 104 is represented by circle 201 and includes an imperfection 202, when part 104 is camouflaged with the background with imperfection 202 identified through image processing techniques. FIG. 3 represents an alternative view 300 of part 104 that might be imaged by one or more feedback cameras 118 under a second light illumination parameter. Part 104 is represented by circle 301 and includes imperfection 302, when part 104 is camouflaged by the background with imperfection 302 identified through image processing techniques. As shown in FIGS. 2 and 3, different imperfections can be identified using different illumination parameters. Both FIGS. 2 and 3 use the feedback control of one or more first illumination sources 108A and/or one or more second illumination sources 108B as described above. For example In FIG. 2, the light reflected from part 104 is homogenized and the contrast of the imperfection 202 relative to color of part 104 is increased, and is more easily detected under conditioned first radiation light 114 after performing the feedback control than under the white light or ambient light illumination.

In contrast to techniques such as "camouflage breaking," the present disclosure does not involve or rely on polarization to enhance imperfection detection. Instead, the present teachings include homogenizing the reflectance of incident light from part 104, such that the reflectance from part 104 becomes uniform with respect to reflected light intensity, thereby camouflaging target area 116 or the entirety of part 104 with a background of additive manufacturing chamber 102, thereby enhancing contrast and detection of imperfections. In other words, first radiation light 110 is adjusted, controlled, and/or varied such that the light reflected from target area 116 or the entirety of part 104 is homogenous or uniform across the image with respect to one or more of hue, saturation, color, and intensity. In effect, a new homogenous or camouflage background is created that, when imaged using one or more feedback cameras 118, shows surface anomalies. For example, while a background of FIG. 2 under illumination of white light camouflages the imperfection 202, part 104 of FIG. 3 under illumination of first light radiation 110 or fourth light radiation 126 subsequent to feedback control highlights the imperfection 202 and eases detection of the imperfection 202.

As discussed above, the inspection system 100 of FIG. 1 includes display 138 that displays output from one or more the feedback cameras 118 that is viewable by an operator. If a surface anomaly is detected, an operator can correct the anomaly using one of the methods described above, or a different method.

Figure 4:
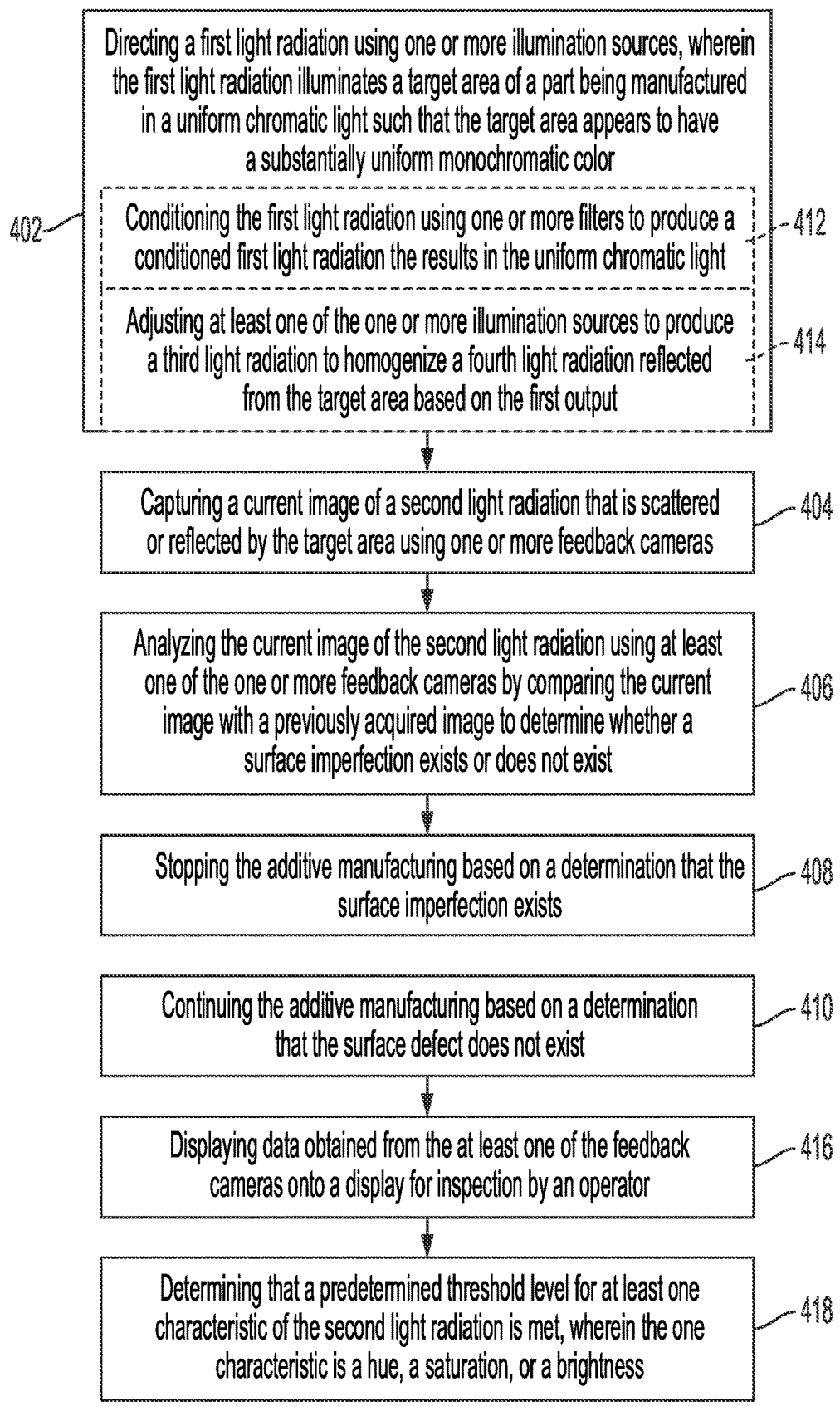
FIG. 4 is a flow chart or flow diagram of an example method for inspecting a workpiece according to the present teachings.

A method 400 for inspecting a workpiece is shown in the flow chart or flow diagram of FIG. 4. The method 400 may proceed by operation or use of one or more of the structures depicted in the figures as described above, and thus is described with reference to FIGS. 1-3; however, it will be appreciated that the method 400 is not limited to any particular structure or use unless expressly stated herein. It will be further appreciated that while the method 400 is described as a series of acts or events, the present teachings are not limited by the ordering of such acts or events. Some acts may occur in different orders and/or concurrently with other acts or events apart from those described herein. Further, a method in accordance with the present teachings may include other acts or events that have not been depicted for simplicity, while other depicted acts or events may be removed or modified.

The method 400 can begin by directing a first light radiation using one or more illumination sources as at 402. The first light radiation illuminates a target area of a part being manufactured in a uniform chromatic light such that the target area appears to have a substantially uniform monochromatic color. For example, first light radiation 110 can be output using one or more illumination sources 188 such as one or more lasers 132, one or more OLED arrays 134, one or more LED arrays 136, or another illumination source.

The method 400 can continue by capturing a current image of a second light radiation that is scattered or reflected by the target area to generate a first output using one or more feedback cameras as at 404. Continuing with the example, light reflected or scatted by target area 116 is then imaged by first feedback camera 130 to generate first output 128 using, for example, first feedback camera 130 of one or more feedback cameras 118 to produce first output 128. The method 400 can continue by analyzing the current image of the second light radiation 120 using at least one of the one or more feedback cameras 118 by comparing the current image with a previously acquired image to determine whether a surface imperfection exists as at 406. Continuing with the example, processor 140, which is coupled to controller 122, executing the one or more image processing algorithms, such as the background image subtraction techniques, the image histogram analyses, as discussed above and further below, and other suitable algorithms, to perform a pattern analysis to determine that first light radiation 110 or fourth light radiation 126 is sufficient to color match or camouflage target area 116 or the entirety of part 104 (e.g., feedback control process).

In background image subtraction, objects are separated from the background in one or more video frames. In one approach to background image subtraction, an estimate is made to the background at time t. The estimated background is then subtracted from an input frame. A threshold, Th, is then applied to the absolute difference to obtain a mask. An absolute difference between two frames can be used to determine the threshold. The background can be estimated to be the previous frame, such that the background subtraction can be provided by the absolute difference between a frame at t and a frame at t−1, or expressed mathematically, as $|I(x,y,t)-I(x,y,t-1)|>Th$. The values of a particular pixel can be modeled as a mixture of adaptive Gaussians. At each iteration, Gaussians are evaluated using a heuristic to determine which ones are most likely to correspond to the background. Pixels that do not match with the background Gaussians are appropriately classified. The pixels are then grouped using a 2D connected component analysis.

The method 400 can continue by stopping the additive manufacturing based on a determination that the surface imperfection exists as at 408. Continuing with the example, first output 128 or subsequent output can be displayed on display 138 for review by an operator according to FIG. 1, or processor 140 can perform an analysis of available data. If first output 128 or subsequent output indicates that imperfections are present, the additive manufacturing is stopped so that imperfections can be corrected, for example, by an operator, or other actions can be taken. The method 400 can continue by continuing the additive manufacturing based on a determination that the surface defect does not exists as at 410. Continuing with the example, first output 128 or subsequent output can be displayed on display 138 for review by an operator according to FIG. 1, or processor 140 can perform an analysis of available data. If first output 128 or subsequent output indicates that defects are not present, the additive manufacturing continues.

The method 400 can comprise conditioning the first light radiation using one or more filters to produce a conditioned first light radiation the results in the uniform chromatic light, as at 412. For example, one or more filters, such as holographic filers, can be used to modify the first light radiation to produce a uniform chromatic light.

The method 400 can comprise adjusting at least one of the one or more illumination sources to produce a third light radiation to homogenize a fourth light radiation reflected from the target area based on the first output, as at 414.

The method 400 can comprises displaying data obtained from the first output from at least one of the feedback cameras onto a display for inspection by an operator, as at 416.

The method 400 can comprises determining that a predetermined threshold level for at least one characteristic of the second light radiation is met, wherein the one characteristic is a hue, a saturation, or a brightness, as at 418.

The analyzing the second light radiation 120 using at least one of the one or more feedback cameras 118, can further comprise determining that a predetermined threshold level for at least one characteristic of the second light radiation 120 is met, as at 416. The one characteristic is a hue, a saturation, or a brightness. The analysis involves comparing a currently acquired image with a previously acquire image or a known defect-free part image the of same part and in the same orientation as the part being made by performing a pixel-by-pixel subtraction of the two images This technique is used for detecting differences in the colors of the two images.

The background subtraction allows for the detection of a defect or imperfection from the difference obtained from a current frame and a previous frame from the camera(s). Each frame from the camera(s) (e.g., one or more feedback cameras 118), can be fed to a running average function, and the running average function can keep finding the averages of all frames. Then, the absolute difference between the frames is computed, which provides an indication of a presence of a defect or the imperfection in the part as the part is being manufactured.

Figure 6:
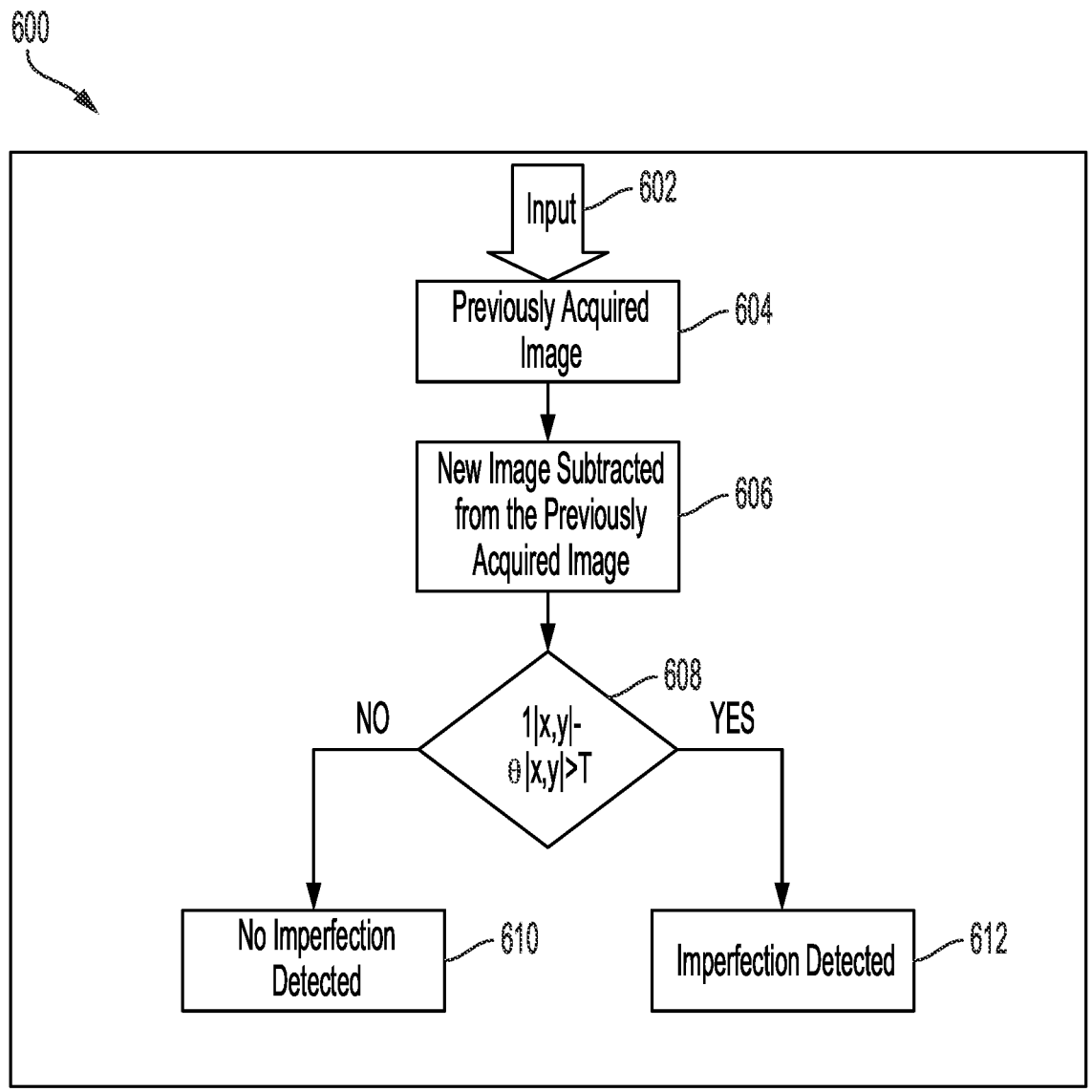
FIG. 6 shows a background subtraction method, according to examples of the present disclosure.

FIG. 6 shows a background subtraction method 600, according to examples of the present disclosure. The background subtraction method 600 obtains an input from the one or more feedback cameras 118 at 602. A previously acquired image is acquired from the one or more feedback cameras 118 at 604. A new image is subtracted from the previously acquired image at 606. A pixel-by-pixel subtraction is performed by the processor 140 at 608. The processor 140 computes a pixel-by-pixel computation between the new image (e.g., I(x,y)) and the previously acquired image (e.g., B(x,y). If the difference between a pixel value of the new image and a pixel value of the previously acquired image is greater than a desired threshold, as discussed above, then the presence of the imperfection is detected at 612 (e.g., the "YES arrow"). On the other hand, if the difference between a pixel value of the new image and a pixel value of the previously acquired image is not greater than a desired threshold, then no imperfection is detected at 610 (e.g., the "NO" arrow).

Processors 140 can be configured to perform the analysis using a color sorting technique via a background lighting. Monochromatic cameras detect shades of gray from black to white and can be effective when sorting products with high-contrast imperfections. Sophisticated color cameras with high color resolution are capable of detecting millions of colors to better distinguish more subtle color defects. Trichromatic color cameras (also called three-channel cameras) divide light into three bands, which can include red, green and/or blue within the visible spectrum as well as IR and UV. In this example, a binning technique can be used. The act of binning of LEDs is the process of sorting LEDs by certain characteristics, such as color, voltage, and brightness. In the lighting industry, standards have been established for dimensions and coordinates of the bins that are currently used to standardize the color points of all white light LEDs. For example, the American National Standards Institute (ANSI) standard C78.377-2017 provides the dimensions and coordinates of the bins that are currently used to standardize the color points of all white light LEDs. These dimensions are calculated from the Correlated Color Temperature (CCT) and the distance from the Plackian Iocus (Duv). The color space can have three dimensions (xyB), where B is the brightness. An image histogram, which is a graphical representation of the number of pixels in an image as a function of their intensity, can be used to perform the color sorting. Histograms are made up of bins, each bin representing a certain intensity value range. The final value of a bin is the number of pixels assigned to it. Coupled with appropriate software, sorters that feature cameras are capable of recognizing each object's color, size and shape as well as the color, size, shape and location of an imperfection on a product, which allows the imperfection to be made visible to a camera.

Figure 5:
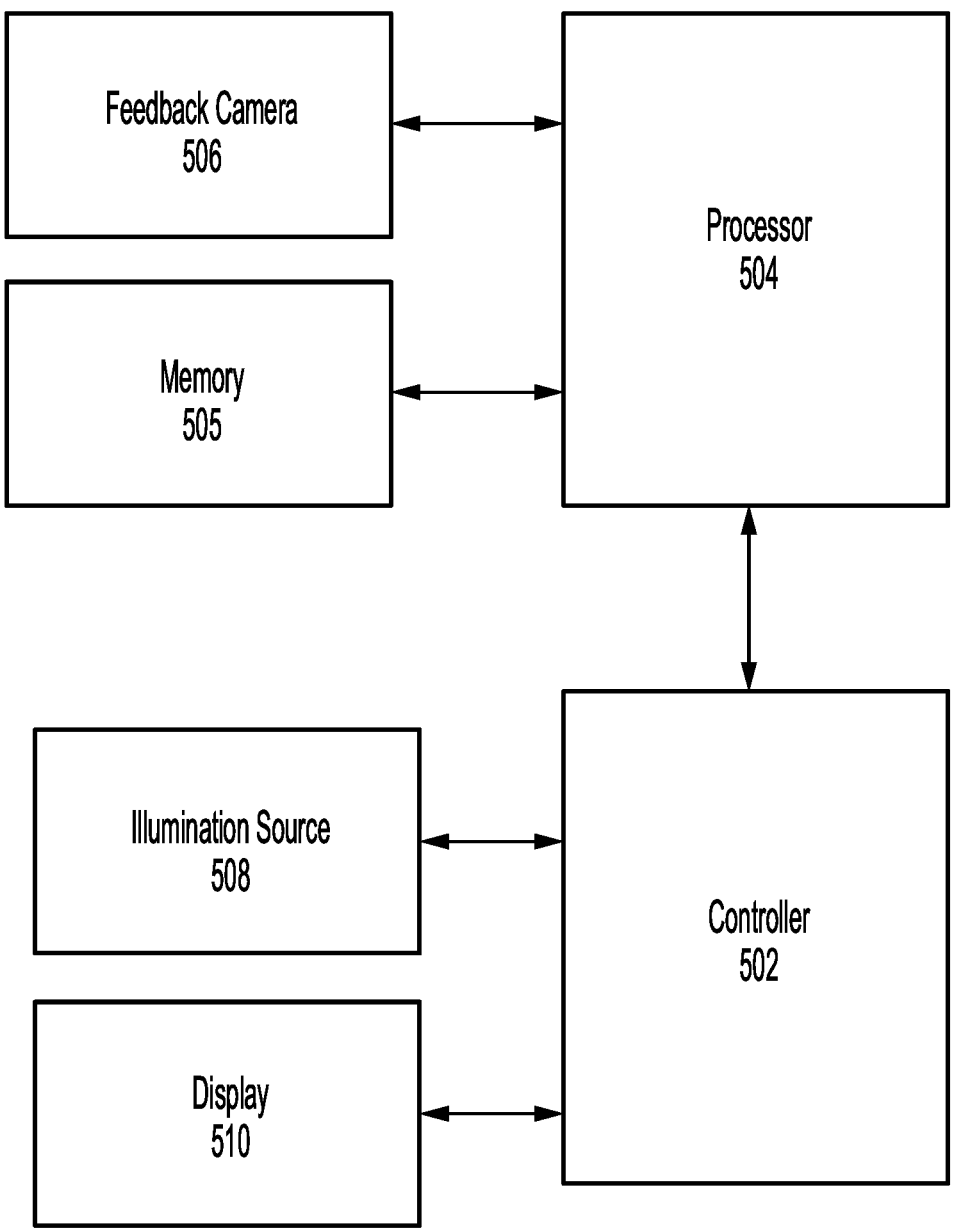
FIG. 5 is a schematic block diagram according to the present teachings.

It is contemplated that each of the components or subsystems of the inspection system may be electrically and communicatively interconnected in various configurations, depending on the design of the inspection system. FIG. 5 is a schematic block diagram depicting an inspection system 500 according to an implementation of the present teachings. Further, an inspection system 500 may include other structures that, for simplicity, have not been depicted or described.

The inspection system 500 includes a controller 502 and a processor 504, which can be part of, or separate from, the controller 502. A computer-readable memory 505 stores instructions to perform one or more of the processes described herein. A feedback camera 506 supplies image data to the processor 504 for analysis, which is used to control an illumination source 508 and a display 510 as depicted. The inspection system 500 can be employed to perform the inspection of a workpiece as described above for other uses.

In some examples, if certain operations are implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with examples of the present disclosure disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more examples, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Further, the disclosure comprises embodiments according to the following clauses:

Clause 1: A method for real-time surface inspection for additive manufacturing and 3-D printing parts, the method comprising:
directing a first light radiation using one or more illumination sources, wherein the first light radiation illuminates a target area of a part being manufactured in a uniform chromatic light such that the target area appears to have a substantially monochromatic color;
capturing a current image of a second light radiation that is scattered or reflected by the target area to generate a first output using one or more feedback cameras; and
analyzing the current image of the second light radiation using at least one of the one or more feedback camera by comparing the current image with a previously acquired image to determine whether a surface imperfection exits or does not exist.

Clause 2: The method of clause 1, further comprising stopping the additive manufacturing based on a determination that the surface imperfection exists.

Clause 3: The method of clause 1 or clause 2, further comprising continuing the additive manufacturing based on a determination that the surface imperfection does not exist.

Clause 4: The method of any of clauses 1-3, further comprising conditioning the first light radiation using one or more filters to produce a conditioned first light radiation that results in the uniform chromatic light.

Clause 4: The method of any of clauses 1-3, further comprising adjusting at least one of the one or more illumination sources to produce a third light radiation to homogenize a fourth light radiation reflected from the target area.

Clause 5: The method of any of clauses 1-4, further comprising adjusting at least one of the one or more illumination sources to produce a third light radiation to homogenize a fourth light radiation reflected from the target area.

Clause 6: The method of any of clauses 1-5, wherein the adjusting at least one of the one or more illumination sources to produce the third light radiation results in homogenizing the fourth light radiation reflected from the target area except for a fifth light radiation reflected from the surface defect.

Clause 7: The method of any of clauses 1-6, wherein a first illumination source of the one or more illumination sources comprises a plurality of light emitting diodes, a plurality of organic light emitting diodes, or a plurality of lasers.

Clause 8: The method of any of clauses 1-7, wherein each element of the plurality of light emitting diodes or the plurality of organic light emitting diodes is individually controlled to produce a hue, a saturation, or a color of each element.

Clause 9: The method of claim 1, further comprising displaying data obtained from the at least one of the feedback cameras onto a display for inspection by an operator.

Clause 10: The method of any of clauses 1-9, wherein the surface imperfection is detected based on an analysis of hue and saturation of the second light radiation to distinguish between anomalies.

Clause 11: The method of any of clauses 1-10, wherein the analyzing the second light radiation using at least one of the one or more feedback camera, further comprises determining that a predetermined threshold level for at least one characteristic of the second light radiation is met.

Clause 12: The method of any of clauses 1-11, wherein the one characteristic is a hue, a saturation, or a brightness.

Clause 13: The method of any of clauses 1-12, wherein the target area comprises the entirety of the part.

Clause 14: The method of any of clauses 1-13, wherein the first light radiation is a monochromatic illumination radiation.

Clause 15: A system for real-time surface defect detection for additive manufacturing and 3-D printing parts, the system comprising:
an additive manufacturing chamber comprising a part to be manufactured;
one or more illumination sources configured to produce a first light radiation;
one or more filters that are configured to condition the first light radiation, wherein the first light radiation that is conditioned illuminates a target area of the part being manufactured in a uniform chromatic light;
one or more feedback cameras configured to capture a current image of a second light radiation that is scattered or reflected by the target area and determine a presence of a surface imperfection at or near the target area based on the second light radiation; and
a controller coupled to the one or more illumination sources and the one or more feedback cameras and configured to adjust at least one of the one or more illumination sources to produce a third light radiation to homogenize a fourth light radiation reflected from the target area based on the one or more feedback cameras, wherein a first feedback camera of the one or more feedback cameras is configured to detect the surface defect based on the fourth light radiation.

Clause 16: The system of clause 15, wherein the additive manufacturing chamber comprises a valve from which a noble gas is introduced.

Clause 17: The system of clauses 15 or 16, wherein the noble gas is helium, nitrogen, neon, argon, or krypton.

Clause 18: A non-transitory computer-readable medium that comprise instructions, that when executed by a hardware processor, cause the hardware processor to perform operations to execute a method for real-time surface inspection for additive manufacturing and 3-D printing parts, the method comprising:
  controlling a first light radiation using one or more illumination sources, wherein the first light radiation illuminates a target area of a part being manufactured in a uniform chromatic light such that the target area appears to have a substantially uniform monochromatic color;
  capturing a current image of a second light radiation that is scattered or reflected by the target area to generate a first output using one or more feedback cameras;
  analyzing the current image of the second light radiation using at least one of the one or more feedback cameras by comparing the current image with a previously acquired image to determine whether a surface imperfection exists or does not exist.

Clause 19: The non-transitory computer-readable medium of clause 18, wherein the operations further comprise stopping the additive manufacturing based on a determination that the surface defect exists.

Clause 20: The non-transitory computer-readable medium of clause 18 or clause 19, wherein the operations further comprise continuing the additive manufacturing based on a determination that the surface defect does not exist.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. A system for real-time surface inspection for additive manufacturing and 3-D printing parts, the system comprising:
  an additive manufacturing chamber comprising a part to be manufactured;
  one or more illumination sources configured to produce a first light radiation;
  one or more filters that are configured to condition the first light radiation, wherein the first light radiation that is conditioned illuminates a target area of the part being manufactured in a uniform chromatic light such that the target area appears to have a substantially uniform monochromatic color that matches a background area of the target area of the part being manufactured;
  one or more feedback cameras configured to capture a current image of a second light radiation that is scattered or reflected by the target area and determine a presence of a surface imperfection at or near the target area based on the second light radiation; and
  a controller coupled to the one or more illumination sources and the one or more feedback cameras and configured to adjust at least one of the one or more illumination sources to produce a third light radiation to homogenize a fourth light radiation reflected from the target area based on the one or more feedback cameras.

2. The system of claim 1, wherein a first feedback camera of the one or more feedback cameras is configured to detect the surface imperfection based on the fourth light radiation.

3. The system of claim 1, wherein the additive manufacturing chamber comprises a valve from which a noble gas is introduced.

4. The system of claim 3, wherein the noble gas is helium, nitrogen, neon, argon, or krypton.

5. The system of claim 1, wherein the controller is configured to stop the additive manufacturing based on a determination that the surface imperfection exists.

6. The system of claim 1, wherein the controller is configured to continue the additive manufacturing based on a determination that the surface imperfection does not exist.

7. The system of claim 1, wherein the one or more illumination sources comprises a plurality of light emitting diodes, a plurality of organic light emitting diodes, or a plurality of lasers.

8. The system of claim 7, wherein each element of the plurality of light emitting diodes or the plurality of organic light emitting diodes is individually controlled to produce a hue, a saturation, or a color of each element.

9. The system of claim 1, wherein the surface imperfection is detected based on an analysis of hue and saturation of the second light radiation to distinguish between anomalies.

10. A system for real-time surface inspection for additive manufacturing and 3-D printing parts, the system comprising:
an additive manufacturing chamber comprising a part to be manufactured;
one or more illumination sources configured to illuminate a target area of a part being manufactured in a uniform chromatic light such that the target area appears to have a substantially uniform monochromatic color that matches a background area of the target area of the part being manufactured;
one or more feedback cameras configured to capture a current image of light radiation that is scattered or reflected by the target area; and
an analyzer configured to compare the current image with a previously acquired image to determine whether a surface imperfection exists or does not exist.

11. The system of claim 10, wherein the additive manufacturing chamber comprises a valve from which a noble gas is introduced.

12. The system of claim 11, wherein the noble gas is helium, nitrogen, neon, argon, or krypton.

13. The system of claim 10, further comprising a controller that is configured to stop the additive manufacturing based on a determination that the surface imperfection exists.

14. The system of claim 10, further comprising a controller is configured to continue the additive manufacturing based on a determination that the surface imperfection does not exist.

15. The system of claim 10, wherein the one or more illumination sources comprises a plurality of light emitting diodes, a plurality of organic light emitting diodes, or a plurality of lasers.

16. The system of claim 15, wherein each element of the plurality of light emitting diodes or the plurality of organic light emitting diodes is individually controlled to produce a hue, a saturation, or a color of each element.

17. The system of claim 15, wherein the surface imperfection is detected based on an analysis of hue and saturation of the second light radiation to distinguish between anomalies.

18. A system for real-time surface inspection for additive manufacturing and 3-D printing parts, the system comprising:
an additive manufacturing chamber comprising a part to be manufactured;
an illumination source configured to illuminate a target area of a part being manufactured in a uniform chromatic light such that the target area appears to have a uniform monochromatic color that matches a background area of the target area of the part being manufactured;
a camera configured to capture a current image of light radiation that is scattered or reflected by the target area; and
an analyzer configured to compare the current image with a previously acquired image to determine whether a surface imperfection exists or does not exist.

19. The system of claim 18, further comprising a controller that is configured to stop the additive manufacturing based on a determination that the surface imperfection exists.

20. The system of claim 18, further comprising a controller is configured to continue the additive manufacturing based on a determination that the surface imperfection does not exist.

* * * * *